(12) United States Patent
Muller

(10) Patent No.: US 10,876,683 B2
(45) Date of Patent: Dec. 29, 2020

(54) SECURING DEVICE AND METHOD OF USE

(71) Applicant: Hilgard Muller, Willow, CA (US)

(72) Inventor: Hilgard Muller, Willow, CA (US)

(73) Assignee: Hilgard Muller, Willow, CA (US)

( * ) Notice: Subject to any disclaimer, the term of this patent is extended or adjusted under 35 U.S.C. 154(b) by 0 days.

(21) Appl. No.: 16/017,302

(22) Filed: Jun. 25, 2018

(65) Prior Publication Data
US 2019/0093819 A1    Mar. 28, 2019

Related U.S. Application Data

(60) Provisional application No. 62/562,297, filed on Sep. 22, 2017.

(51) Int. Cl.
| | | |
|---|---|---|
| *F16M 13/00* | (2006.01) | |
| *F16M 13/02* | (2006.01) | |
| *F16G 11/00* | (2006.01) | |
| *F16M 13/04* | (2006.01) | |

(52) U.S. Cl.
CPC ............ *F16M 13/02* (2013.01); *F16G 11/00* (2013.01); *F16M 13/04* (2013.01)

(58) Field of Classification Search
CPC ........................................................ F16L 3/00
USPC .... 248/68.1, 74.1, 74.3, 80, 83, 89; 211/194
See application file for complete search history.

(56) References Cited

U.S. PATENT DOCUMENTS

| | | | | |
|---|---|---|---|---|
| 2,130,825 A | * | 9/1938 | Bergan ..................... | H01R 4/22 403/396 |
| 3,099,271 A | * | 7/1963 | Dubelier .................. | A45D 8/34 132/273 |
| 5,577,299 A | * | 11/1996 | Thompson ............ | F16G 11/046 24/115 H |
| 8,245,360 B2 | | 8/2012 | Stafford et al. | |
| 8,356,613 B2 | | 1/2013 | Ma | |
| 10,384,088 B1 | * | 8/2019 | McDonald ............ | B65H 57/14 |
| D862,214 S | * | 10/2019 | Muller .......................... | D8/383 |
| 2003/0041416 A1 | * | 3/2003 | D'Addario .............. | F16L 3/233 24/15 |
| 2011/0107557 A1 | | 5/2011 | Burke et al. | |
| 2013/0232731 A1 | | 9/2013 | Schradin et al. | |
| 2013/0250736 A1 | * | 9/2013 | Yang ...................... | G04G 17/08 368/11 |
| 2018/0179780 A1 | * | 6/2018 | Dershem ............... | E04H 15/644 |

OTHER PUBLICATIONS

SMV Industries, "12" Canopy Ball Bungee—8 Pack", retrieved on Jun. 25, 2018, 1 page. https://www.qcsupply.com/12-canopy-ball-bungie-6-pack.html#review.

* cited by examiner

*Primary Examiner* — Steven M Marsh
(74) *Attorney, Agent, or Firm* — Christopher Mayle; Thomas E. LaGrandeur; Bold IP, PLLC

(57) ABSTRACT

Embodiments are provided for a securing device that has a housing, one or more securing members, a center protruding member, and a reservoir. Additionally, located between the securing members and the center protruding member is a trough and one or more valleys. A rope member is capable of semi-circling the center protruding member and being secured to the securing device by the securing members. Additionally, a rope member can be secured to the securing device by passing a portion of the rope member through at least one internal channel located within an interior of the securing device.

17 Claims, 13 Drawing Sheets

SECURING DEVICE AND METHOD OF USE

CROSS-REFERENCE TO RELATED APPLICATIONS

This application claims priority to U.S. Provisional Application No. 62/562,297 filed Sep. 22, 2017, which is incorporated by reference in its entirety.

FIELD OF THE DISCLOSURE

This disclosure relates generally to the field of securing devices, and more particularly, to a rope member securing device that is easy to use and attaches to a rope member to provide a method of preventing a looped rope member from slipping off the device that may further be used to secure an object to a fixed point.

BACKGROUND

Outdoor enthusiasts are familiar with the importance of bungee cords. Bungee cords are frequently used, for example, to secure a tarp to cover a boat or a canopy for a tent to name a few instances of how they may be used. These bungee cords and other forms of rope are very important in securing tarps and canopies securely to the objects they are trying to protect. If, for example, a tarp is not securely tied to a boat when the owner is not around, the tarp can come undone, leaving the interior of the boat exposed to the elements.

Thus, outdoor enthusiasts value how important it is to have effective tools to implement a tie-down system, such as using an adjustable strap to apply tension to a tarp or canopy, or other cover member, to generate sufficient downward force to hold the cover members in place. To help these enthusiasts securely tie-down these tarps or canopies, these covers usually have metal or hard plastic reinforced holes in the corners of the covers. These holes allow the user to run a rope member through the holes so every corner of the cover can be tied down.

One popular method of securing a cover member to a fixed frame is with the use of a ball bungee. Ball bungees consist of a loop of elastic cord having a ball at the tied end of the loop. A reservoir is usually located underneath the ball portion of a ball bungee. Ball bungees further include a hole running through their housing, allowing a user to tie a slip knot in the cord that is bigger than the hole so that the ball stays secured to the cord with the slip knot in the reservoir, and is essentially too big for the ball to come off or slip through. When securing a cover member, a user can slip the loop of the ball bungee tie through the cover member's reinforced corner hole, wrap the loop around the object the user wishes to secure the cover member to, and then secure the hold by wrapping the loop around the ball end of the bungee tie.

These traditional bungee ties have presented many problems because the bungee cord can easily slip off the ball end of the bungee tie. This problem is more evident when a cover member (e.g. tarp or tent or canopy) is under increased tension, such as when a strong gust of wind blows underneath a cover member. Additionally, these bungee ties do not provide any other means for attaching to available rope members, which means that there is no other force helping keep these ties secure.

There have been some attempts to provide alternatives. For example, U.S. patent application Ser. No. 13/788,703 discloses a collection and identification device disposed on an end of an elastic binder line to facilitate flexible, quick, and secure collection of items. This patent application includes a ball stop, a slide lock, a pull tab, and a binder line attached to the pull tab and the ball stop, whereby the slide lock slides along a portion of the binder line to selectively capture captive material against one of the pull tab and ball stop.

Although this patent application attempts to describe using various ways to collect and secure items, the patent application still includes several disadvantages of the conventional tie down systems. More specifically, this patent application fails to include an adequate system or apparatus that can sufficiently secure a tarp or canopy.

U.S. Pat. No. 8,245,360 is another example of existing attempts to address the shortcomings of conventional bungee cords and tie downs. This patent describes a slip-knot grip device which attaches to a rope, and consists of two end caps with an insert placed within the two end caps connected by a retaining collar. The inserts have a semi-circular channel on their interior which the rope passes through and secures to the rope by pinching when end caps are turned and connected together. This patent, however, does not sufficiently provide a secure enough alternative to existing bungee cords and tie downs.

Due to all of the existing shortcoming in presently available devices, there is still a need for a ball griping device that allows for easy adjustable position on a rope member to adjust tension, that further prevents a rope member loop from slipping off the device, allowing for a more secure fastening of a cover member as described further below in the present description.

SUMMARY

The disclosure presented herein relates to a securing device that works with a rope or bungee cord (hereinafter "rope member"), to secure a tarp or canopy (hereinafter "cover member") to an object, or bundle objects together. In one or more non-limiting examples, a rope member as described in one or more embodiments herein may be used as a securing device for securing a tarp to a boat and/or a canopy to a tent. Those of ordinary skill will appreciate that other uses may be foreseeable also and are included within the scope of the present description.

In one aspect, one or more embodiments for a securing device are provided in the present description, whereby the securing device includes a housing, one or more securing members, a trough, at least one internal channel, and a reservoir. Further, the present securing device may comprise one or more internal channels that have a diameter at one end that is capable of restricting the movement of said housing on a rope member and is capable of releasing the securing device from the rope member by squeezing the securing device at a second end to widen the one or more internal channels diameters at the first end and reduce friction.

The preceding and following embodiments and descriptions are for illustrative purposes only and are not intended to limit the scope of this disclosure. Other aspects and advantages of this disclosure will become apparent from the following detailed description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

DETAILED DESCRIPTION

Figure 1:
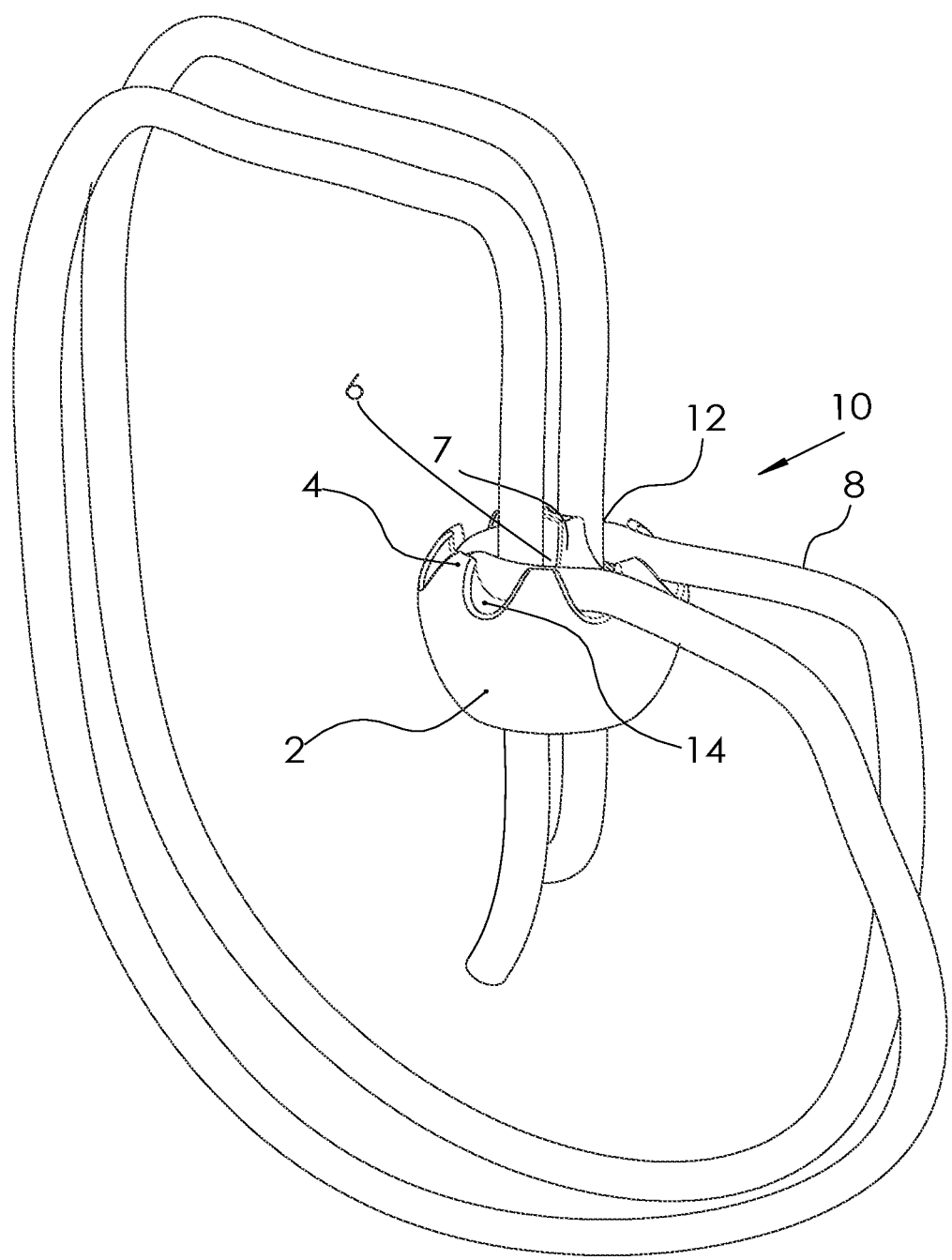
FIG. 1 is a view of an exemplary securing device according to various aspects of the present disclosure.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose limit is the second number. For example, 25 to 100 mm means a range whose lower limit is 25 mm and upper limit is 100 mm.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present description includes one or more embodiments for various securing devices that may be used to secure and tie-down a cover member to an object, or bundle objects together. In one or more embodiments, an included securing device may include multiple methods for griping a rope member internally and ensuring the restriction of any unwanted movement of the rope member. For example, in one or more embodiments, various securing members may be located on the securing device's housing to prevent a looped rope member from slipping over the device. The securing devices, in one or more embodiments, may be combined with other methods to allow for a more secure and flexible tie-down of a cover member to a fixed object. Elements included herein are meant to be illustrative, rather than restrictive. Persons having ordinary skill in the art relevant to the present disclosure may understand there to be equivalent elements that may be substituted with the present disclosure without changing the essential function or operation of the device.

Turning to FIG. 1, a view of a securing device is shown, namely, the securing device 10. In one or more embodiments, securing device 10 may be used along with a rope member to tie down any sort of cover member known in the art, including a tarp or canopy without limitation. The term "rope member" may interchangeably be referred to as a cord or a rope. Rope member may be made of any type of material known in the art or any combination of materials.

In one or more embodiments, this securing device 10 may include a housing, such as the housing 2. In one non-limiting embodiment, the housing 2 of the securing device 10 is a generally spherical shape with a top surface and includes one or more elements adapted to hold a rope member (e.g. rope member 8). In another embodiment, the securing device 10 may be of any preferred shape or size. Further, this securing device 10 may be integrally formed or made as a combination of one or more elements, and may be formed of any material known in the art.

The securing device 10 shown in FIG. 1 may further include the rigid securing members 4 located at top surface of the securing device 10 and distributed along the outer perimeter of the top surface of the securing device 10. In an exemplary embodiment, the rigid securing members 4 have tapered ends that extend inwardly from the outer edges of the securing device 10. As shown in FIG. 1, there are six rigid securing members 4, although more or less rigid securing members may be used in alternative embodiments without limitation. Further, the arrangement of and appearance of the rigid securing members 4 may vary in alternative embodiments. In this embodiment, rigid securing members 4 are configured to prevent rope member 8 from slipping off of housing 2, as the rigid securing members 4 are configured to hold and contain in place rope member 8 to housing 2.

Figure 3:
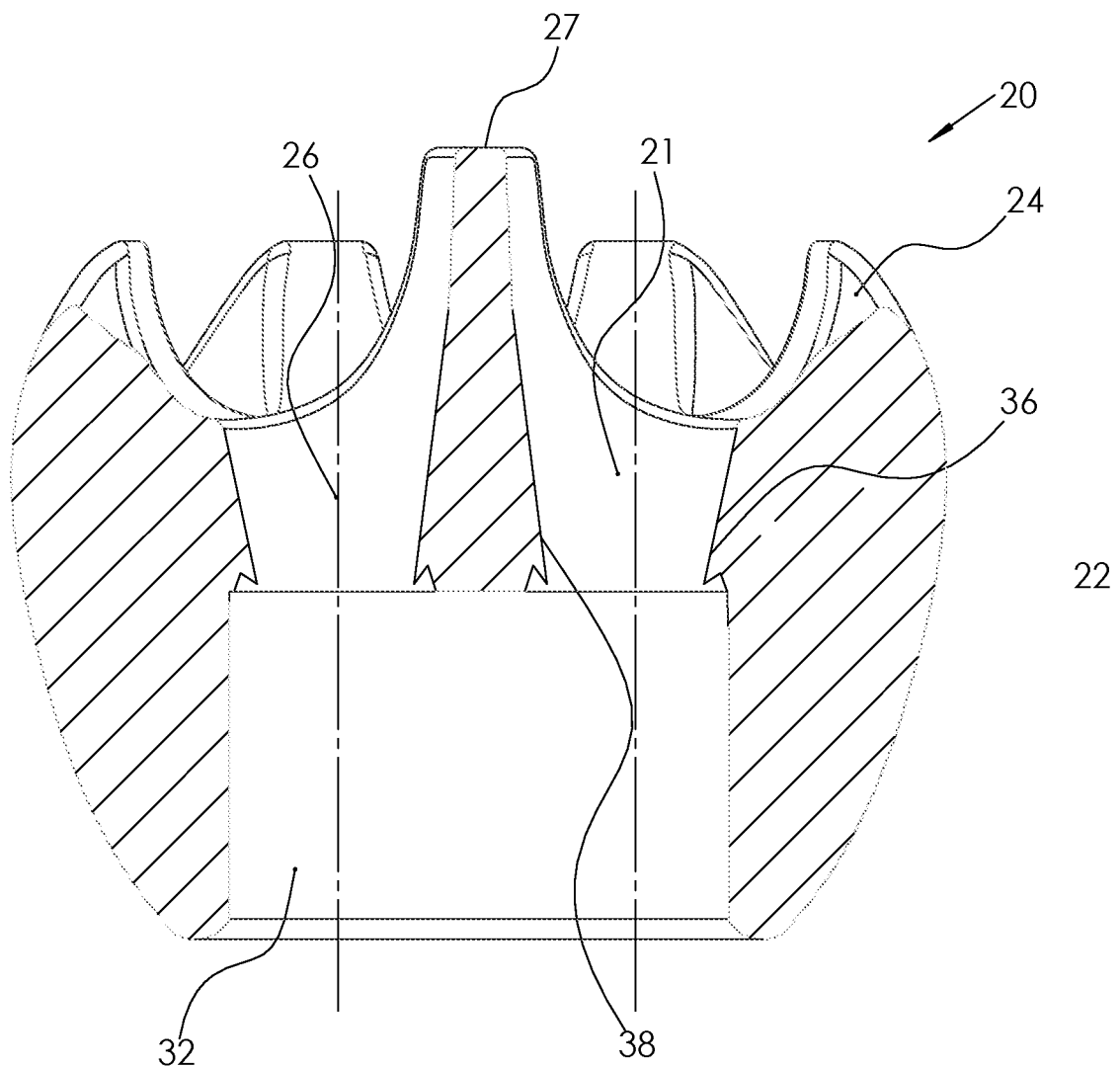
FIG. 3 is a cross-sectional view of the securing device shown in FIG. 2.

The exemplary embodiment of securing device 10 shown in FIG. 1 may further include one or more internal rope member channels, such as internal rope member channels 6 and 12. Internal rope member channels 6 and 12 are located on either side of a center protruding member 7 that protrudes upwardly from substantially a center part of the securing device 10. One or more internal rope member channels, such as channels 6 and 12, may each include a bore or aperture that extends through the interior body of the housing 2 of the spherical securing device 10. The internal rope member channels 6, 12 may end at the entrance of a reservoir, such as the reservoir 32 (e.g. as shown in FIG. 3). Reservoir 32 may be an open cavity space within the interior body of housing 2 of the spherical securing device 10.

In one or more embodiments, a diameter of each of the internal rope member channels 6, 12 is sufficiently wide enough such that a rope member (e.g. rope member 8) may pass through one or both of the internal rope member channels 6,12 and out of the housing 2. In this embodiment, a user selects the rope member 8 by how much the rope member 8 stretches, as the rope member 8 gets narrower while being stretched when tying down a cover member. It may be desirable that the rope member that is to be used to tie down a cover member has a wide enough thickness to maintain compression inside of the internal rope member channels 6, 12, but not so tight that the rope member 8 cannot fit into or slide through the channels 6, 12 when the user wants to adjust the position of the housing 2.

To use the securing device 10, in one or more embodiments, a rope member 8 may be inserted through each of the internal rope member channels 6, 12 (e.g. as shown in FIG. 1). The portions of the rope member 8 that are located in the apertures of the internal rope member channels 6, 12 may be naturally secured in place through friction with the sides of the walls, griping, tension, or other attachment means suitable to restrict the movement of the securing device 10 on the rope member 8. To release the portions of the rope member 8 located within the internal rope member channels 6, 12, a user may squeeze the housing 2 by compressing the body of the housing 2 at a second end of the housing 2. For example, one may squeeze closer towards the lower half of the body of the housing 2 to release rope member 8 from its gripped position within internal rope member channels 6 and 12. This act of compressing the lower half of the housing 2 may cause a first end of the housing 2 (e.g. the upper portion of housing 2) to widen, which may cause the release of the portions of the rope member 8 located within the internal rope member channels 6, 12.

Figure 2:
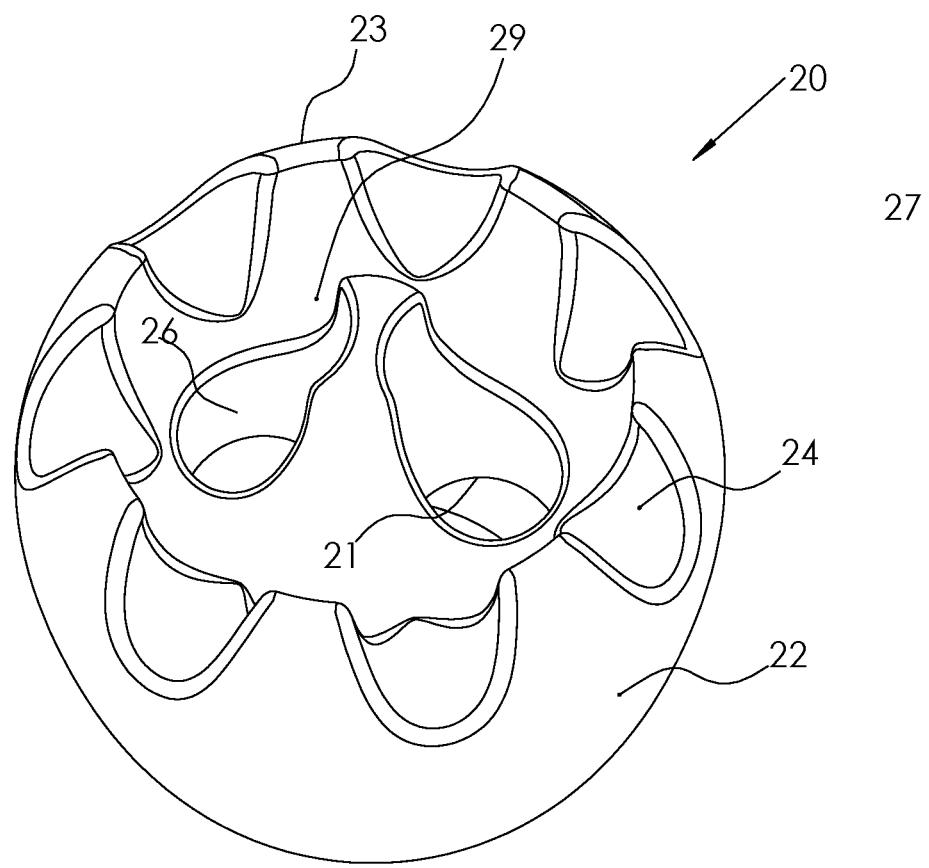
FIG. 2 is a view of the exemplary securing device of FIG. 1 without a rope member according to various aspects of the present disclosure.

The reservoir, such as reservoir 32, is more clearly shown in FIG. 3. Reservoir 32, in one or more embodiments, may be deliberately sized to be capable of holding a slip knot formed from the excess end portions of a rope member 8. Beneficially, having the reservoir 32 may be useful in providing another way of securing the rope member 8 and keeping the rope member 8 in place. A trough, such as trough 29 as shown in FIG. 2, may also be located between said one or more of the securing members 4 and said center protruding member 7 shown in FIG. 1. A trough, such as trough 29, may be recessed to some degree into the body of the securing device 10 at the top surface of the securing device 10 and also may be located beneath or near the securing members 4.

In this embodiment, a user can use the securing device 10 to help tie down a cover member, or any other object that a rope can be used to secure in place. In this embodiment, the rope member can pass, and be secured through the housing 2 through the internal rope member channels 6, 12. As seen in FIG. 1, a user may loop a portion of rope member 8 around the central protruding member 7, whereby the remaining portions of the rope member 8 rest against a trough (that resembles trough 29 of FIG. 2) located on a top surface of housing 2 of securing device 10. The non-looped ends of the rope member 8 may be inserted into the one or more internal rope member channels 6, 12 in order to be secured to the securing device 10. Advantageously, the user does not have to tie a knot to secure the rope member 8 to the securing device 10, because trough 29 and rigid securing members 4 help to contain some of rope member 8 while the remaining portion is contained within internal rope member channels 6 and 12, and reservoir 32. Additionally, after securing the non-looped end of the rope member 8 to the housing member 2, the user, for example, can run the looped end of the rope member through a designated hole located in a tarp. In one or more exemplary embodiments, the housing 2 of the securing device 10 may be larger than this designated hole located in the tarp, which beneficially prevents the securing device 10 (e.g. ball bungee) from being able to pass through the designated hole in the tarp. To further secure a tarp in place, the looped end of rope member 8 may then be wrapped around another solid object the user wishes to attach the tarp to, such as a rail on a boat or other structure without limitation, and then wrap a rope member 8 around the housing 2 as shown in FIG. 1. In this embodiment, the trough (e.g. such as the trough 29 in FIG. 2) between the securing member 4 and the center protruding member 7 is adapted to hold a rope member 8. Additionally, the securing member 4 of housing 2 may assist to prevent the rope member 8 from being able to slip around the housing 2, and further prevents a tarp to which securing device 10 is coupled from coming loose.

FIG. 2 shows another view of securing device 20. As shown in FIG. 2, in this embodiment the housing 22 has seven securing members 23, unlike the FIG. 1 embodiment which had six securing members, distributed along the top surface of the securing device 20, although more or less, securing members 23 may be used in other embodiments. The embodiment in FIG. 2 is otherwise substantially the same/similar to the embodiment in FIG. 1. For example, in one embodiment, the securing device 20 may only have one securing member. The securing members 23 may have a tooth like shape, which allows the securing device 20 to grip a rope member, such as a rope member during operation. In-between the secured teeth members (e.g. securing members 23) may be located individual valleys, such as the valley 24 shown in FIG. 2. The valley 24 may allow a rope member to stay in place when the rope member, or portions thereof, are held in place using one or more components of the securing device 20. Additionally, the valley 24 may allow a securing member, such as securing member 23 to have a better grip on a rope member by allowing securing member 23 to have a greater height relative to the bottom of the valley 24. Further, when in use, a portion of the rope member may be inserted through one of the valleys 24 and then be secured in place by the securing members 23.

Further, a portion of rope member may then be wrapped around the center protruding member 27, allowing the rope to rest along trough 29, and exit through a different valley 24, securing the looped rope member to securing device 20 and preventing the rope member from slipping off.

FIG. 3 shows a cross-sectional view of the securing device 20, as shown in FIG. 2. FIG. 3 shows the internal rope member channels 26, 21 extending through an interior body of the securing device 20. In one embodiment, the respective diameters of the internal rope member channels 26, 21 are sized to accommodate or complement a diameter of a rope member. Alternatively, or additionally, the respective diameters of internal rope member channels 26, 21 may be slightly larger than the diameter of a rope member such that the rope member is able to pass through the internal rope member channels 26, 21, yet is still firmly held in place and under tension. An objective of this non-limiting design of internal rope member channels 26, 21 is to "pinch" or compress the portions of a rope member that are inserted and located within internal rope member channels 26, 21, and thus restrict their movement in or out of channels 26, 21.

As shown in FIG. 3, barbs 38, 36 may be located within each of the internal rope member channels 26, 21. The barbs 38, 36 protrude outwardly, respectively, from the inner surfaces of the internal rope member channels 26, 21. The barbs 38, 36 are located on opposing sides of the internal rope member channels 26, 21 as shown in FIG. 3. These barbs 38, 36 may have many functions. For example, the barbs 38, 36 may reduce a diameter of the internal rope member channels 26, 21 such that the portions of a rope member passing through the internal rope member channels 26, 21 is more likely to be secured in place. Further, barb 38, 36 may assist in forming a one-way channel that a rope member may pass through in one direction but not pulled out in the opposite direction. In one or more embodiments, the barbs 38, 36 are designed with a particular shape such that the overall shape of barbs 38, 36 is that of an arrow having pointed ends. The pointed ends of the barbs 38, 36 may act to tightly grip the portions of a rope member passing through the internal rope member channels 38, 36 if a user or some other force attempts to pull a rope member in a direction away from the barb's points. Notably, the barbs 38, 36 help secure a rope member in place within the internal rope member channels 26, 21 by restricting the movement of the rope member, as the pointed barbs 38, 36 assist in the resistance of any movement of the rope member and prevent the rope member from slipping out of the securing device 20.

When a user purposefully seeks to remove the securing device 20 (for example, to simply adjust the location of the securing device 20 or to remove the securing device 20) a user can squeeze the securing device 20 toward the bottom surface of the housing 2. Squeezing the securing device 20 from both sides at the bottom surface of housing 2 may cause a lower portion or lower half of the securing device 20 to contract at the bottom while simultaneously expanding an upper portion or upper half of securing device 20 located toward the top of the securing device 20, thus allowing the barbs 38, 36 to be pulled away from the portions of the rope member inserted through the internal roper member channels 26, 21 and then allowing the rope member to be freely pulled out of the securing device 20.

In FIG. 3, the reservoir 32 located within an interior body of the housing 22 can be seen. Reservoir 32 may also interchangeably be referred to as a cavity located within the housing 22 and beneath both of the internal rope member channels 26, 21. As previously described, in one or more embodiments, the reservoir 32 may be useful in holding a slip knot (not shown in Figures) that a user may form from the excess ends of a rope member. To locate a slip knot in reservoir 32, the user first inserts a portion of the rope member through both internal rope member channels 26, 21 such that portions of the rope member extend through the internal rope member channels 26, 21 and through the reservoir 32 out through the bottom surface of the housing 22. Accordingly, when the rope member is of a sufficient length, there may be excess portions of rope member located beneath reservoir 32 and beneath the housing 22. A user may then take the excess ends of the rope member located beneath the reservoir 32 and beneath the housing 22 and form a slip knot (using any method known by a skilled person to form a slip knot). Upon forming a slip knot from the excess end portions of the rope member after the rope member has been extended through each of the internal rope member channels 26, 21, the user may pull up slightly on the rope which should locate the formed slip knot within reservoir 32. In some embodiments, this slip knot is larger than the internal rope member channels 26, 21, thus creating a more secure hold of the housing 22 on the rope member.

In one or more embodiments, the reservoir 32 is a novel and helpful element of the securing device 20 that adds additional security. In addition to the additional griping of rope member provided by the barbs 38, 36 in each of the internal rope member channels 26, 21, and in addition to the tight fit and narrower diameter of the internal rope member channels 26, 21 that serves to hold the rope member in place, a user can further ensure that the rope member stays secured by tying a slip knot at the desired location in the rope member. As long as the formed slip knot is larger than the diameter of the internal rope member channels 26, 21, the housing 22 is not able to slip off of the rope member. This will secure the securing device 20 to a rope member, and allows the user to have different options when using the securing device 20 to tie down a cover member or other object.

Figure 4:
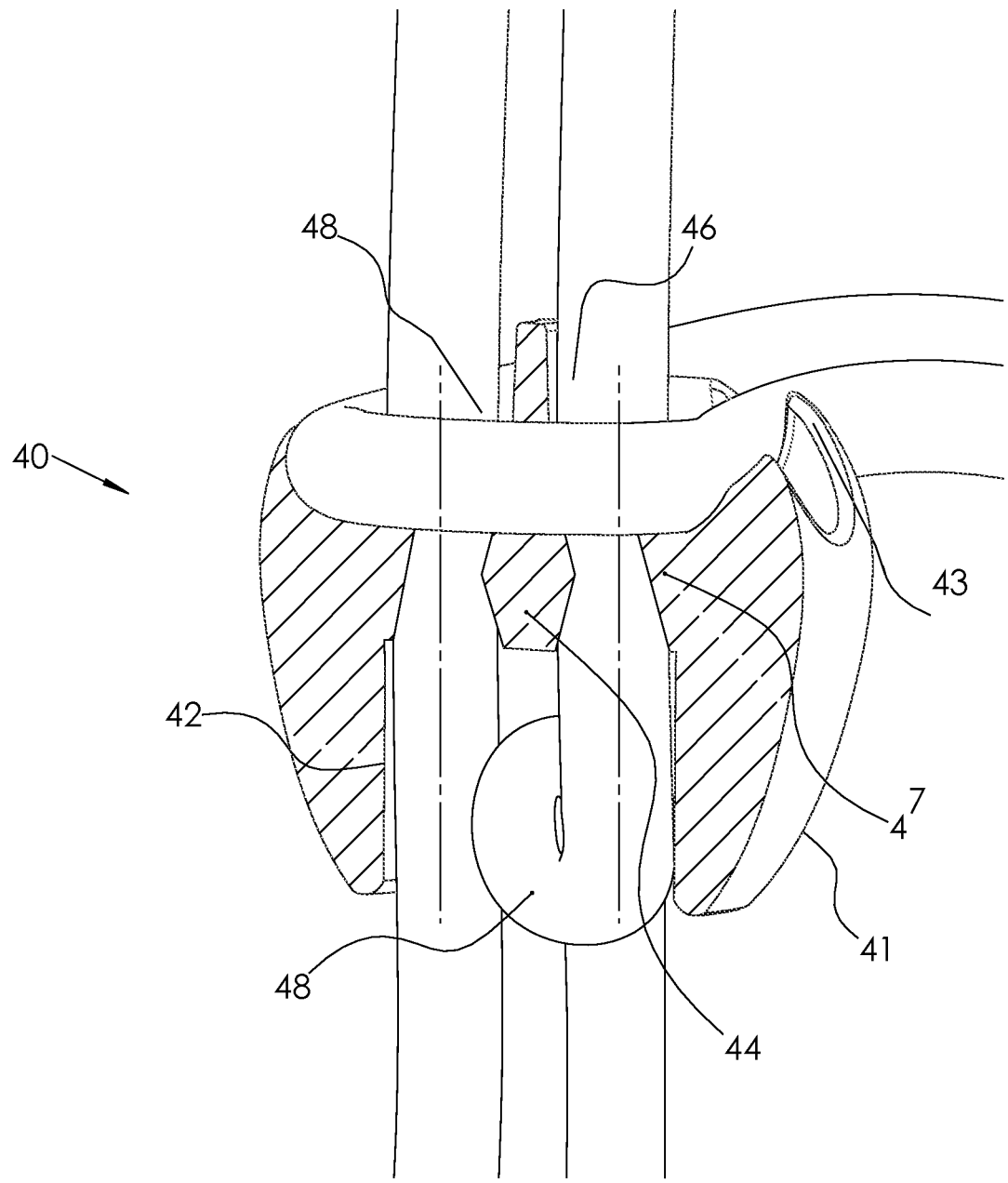
FIG. 4 is a cross-sectional view of one embodiment of the securing device.

FIG. 4 shows a side cross-sectional view of an alternative embodiment of a securing device 40. In this FIG. 4 embodiment, the securing device 40 does not include barb members such as the barb members 38, 36 shown and described above with respect to FIG. 3. Rather, the internal rope member channels 46 and 48 are formed to decrease in diameter in the middle of the channels, between the divider 44 and inner wall 47. This decreased diameter inside the internal rope member channels 46 and 48 means that the narrower passage provides additional compression on the portions of the rope located between the divider 44 and inner 47, and within the bores of the internal rope member channels 48, 46. Thus, the securing device 40 may be used to ensure that the rope inserted within the internal rope member channels 48, 46 is fixed in place by virtue of the diameter of narrow inner walls being sized with a low clearance with respect to the width of the rope inserted therein. The tight fit of the rope located within the internal rope member channels 48, 46 means that there is greater restriction of any possible movement in or out of the internal rope member channels 48, 46.

It is noted that diameter of the rope that is to be inserted in the internal rope member channels 48, 46 may need to be somewhat smaller than the diameter of the internal rope member channels 48, 46, otherwise a rope having a larger diameter is not going to be able to fit through internal rope member channels 48, 46. Further, the divider 44 located between the channels 48, 46, in this embodiment, comes a to point in the internal rope member channels 48, 46, creating additional pressure and restriction of the movement of a rope member located within the internal rope member channels 48, 46 to provide an even better hold. In another embodiment, the securing device 40 can be adjusted by squeezing the device 40 laterally from opposite external sides, by placing one's fingers at the bottom of the device housing member when the reservoir 42 is facing downwards. This will decrease the width of the reservoir 42 while simultaneously expanding the width of the internal rope member channels 48, 46, releasing the hold of the rope members by the inner walls of internal rope member channels 48, 46 and allowing the securing device 40 to slide off or be adjusted.

FIG. 4 also depicts a knot 48 formed from a portion of a rope member, whereby knot 48 is located within the cavity of reservoir 42. In this embodiment, the knot 48 is larger in size and diameter than that of the internal rope member channels 48, 46, which further secures rope member within the body of the housing of the securing device 40. In this embodiment, a user could run one end of a rope member through inner rope member channel 46 in a direction from a first end of the device 40 (e.g. the securing member end of the housing 41), through the housing 41, and out a second end of the securing device 40 (the reservoir 42 end of the securing device 40). Subsequently, a user could run the second end of the rope member through the inner rope member channel 46 in the same direction through the securing device 40, and knot both ends of the rope member to form a knot 48. This would create a looped rope member coming out of said first end of the housing 41, allowing a user to, in one example, run the looped rope member through the hole of a cover member (not shown) and then around the object (not shown) the user wants to secure the cover member to, then around the securing device housing 41 as depicted in FIG. 4, thus securing the cover member to the object with the securing device. The securing members 43 on top of the securing device may prevent the rope member from slipping off of the securing device 40.

Figure 5:
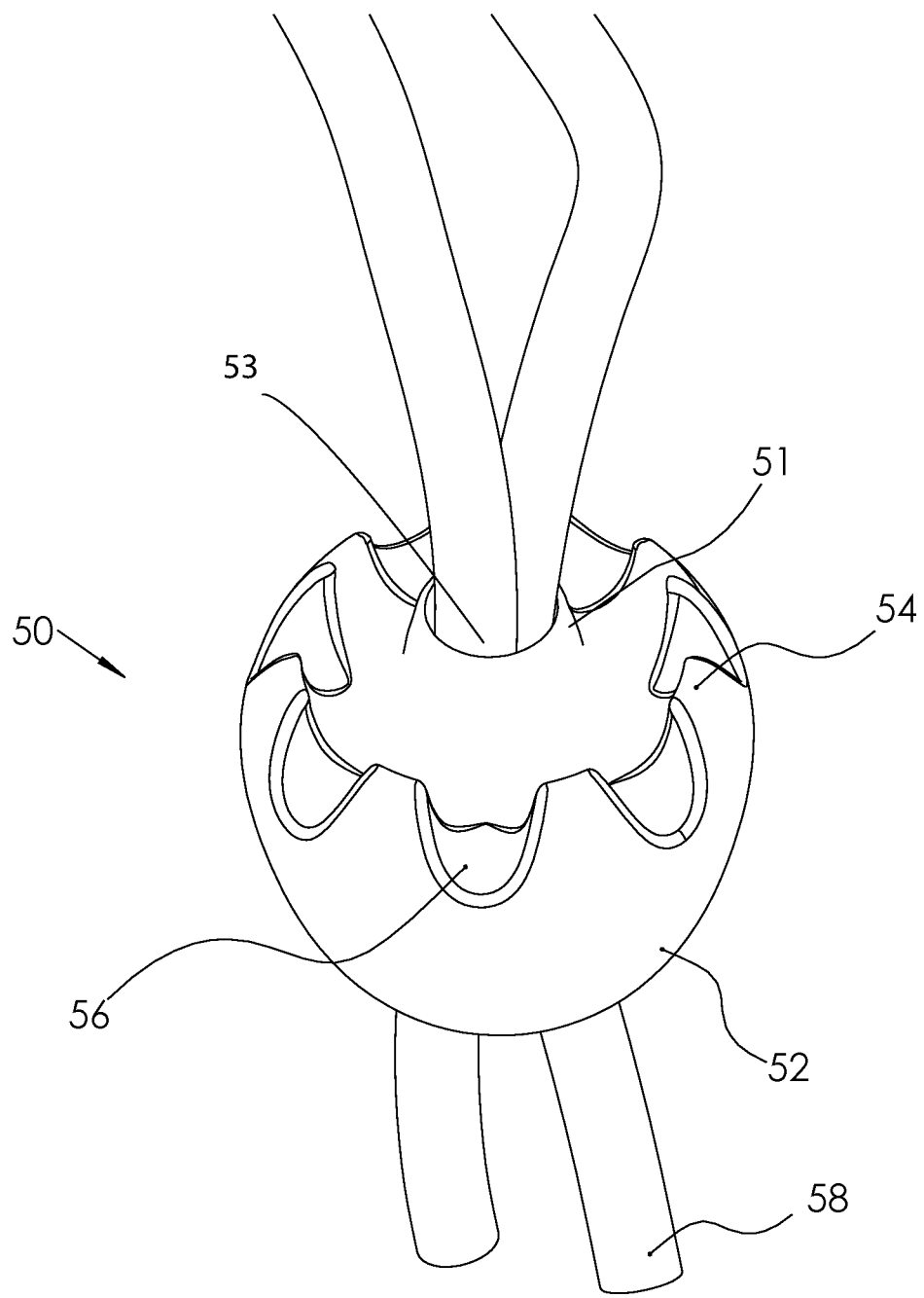
FIG. 5 is a view of one embodiment of a securing device having a single rope member channel.
Figure 6:
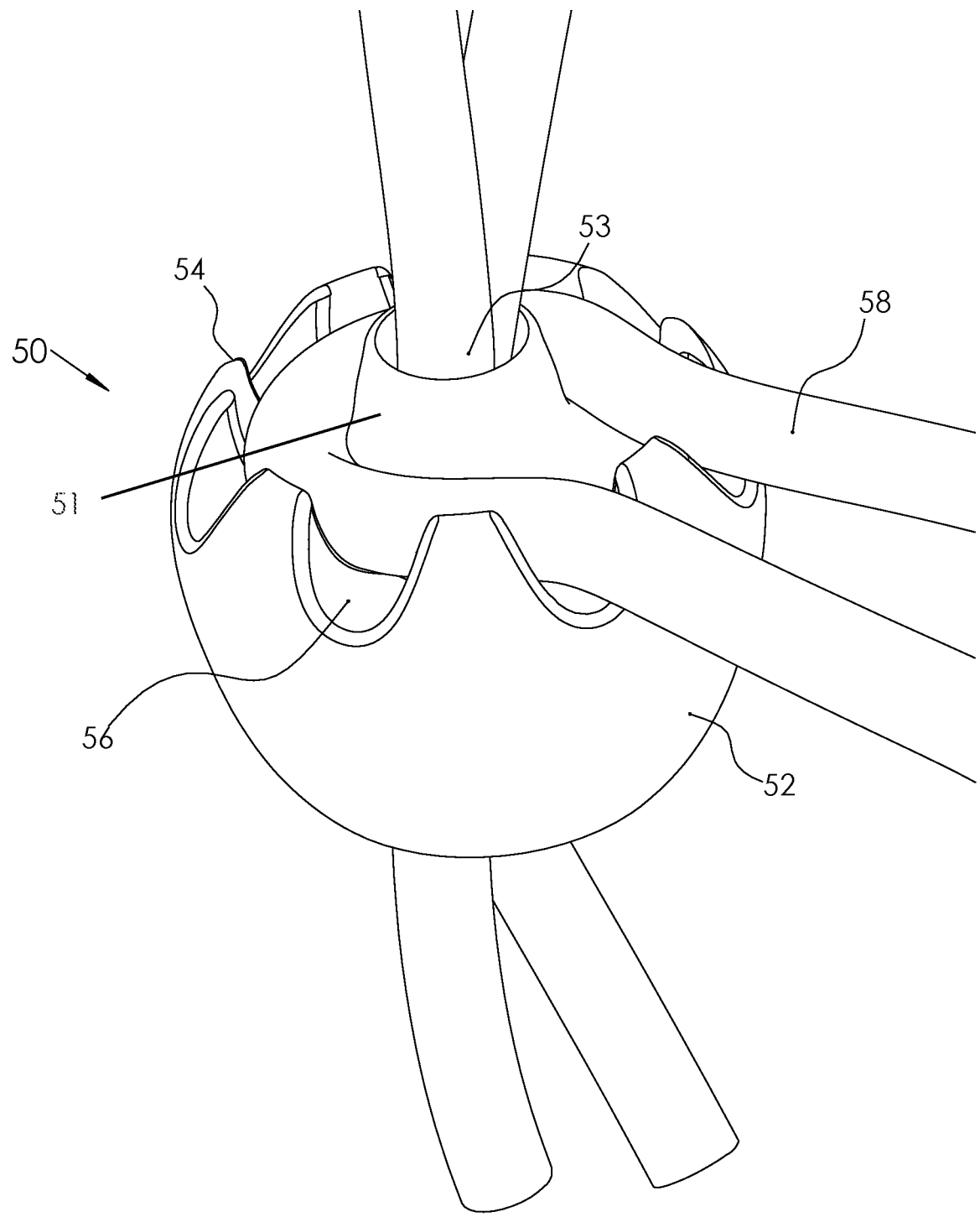
FIG. 6 is a view of the securing device shown in FIG. 5.
Figure 7:
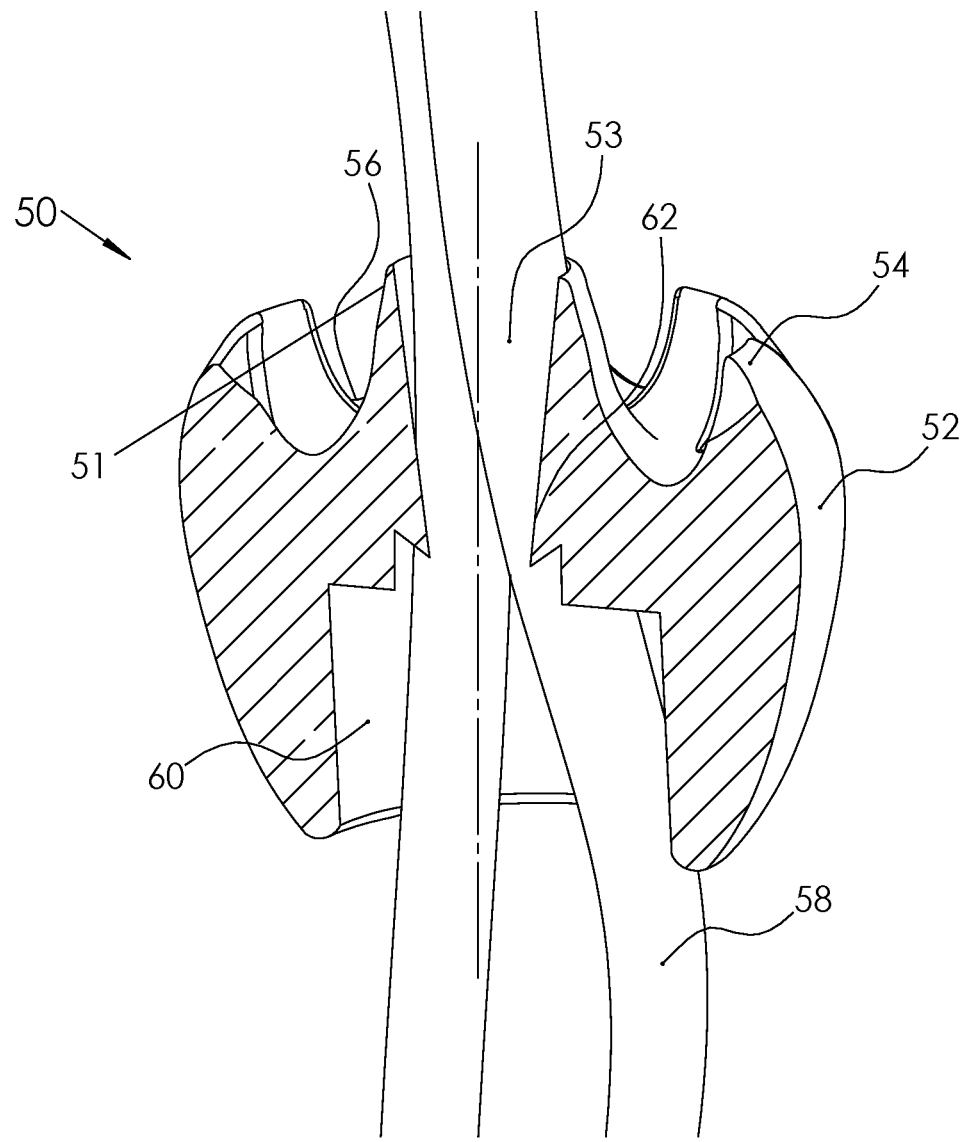
FIG. 7 is a cross-sectional view of the securing device shown in FIG. 5.

Turning to FIGS. 5-7, FIGS. 5-7 show various views of an alternative embodiment for a securing device, which is securing device 50. Securing device 50 is an example of another useful securing device provided in the present description. FIG. 5 shows the center protruding member 51, the securing member 54, the housing 52, the valley 56, and the rope member 58. In this embodiment, securing device 50 has one internal rope member channel through 53 which a rope member may be inserted, which passes through a body of securing device 50 in a generally central location. Additionally, the center protruding member 51 includes an opening for the rope member. In one or more embodiments, the center protruding member 51 has a symmetrical cone shape. In this embodiment, a single rope member can pass through the external rope member channel twice, or two separate rope members can be used.

FIG. 6 shows another view of the embodiment from FIG. 5. As shown in FIG. 6, a looped rope member 58 passes through one of the valleys 56 between the securing members 54 and wraps around the center protruding member 51 before exiting out of a second valley 54. The looped rope member is secured from slipping off of the device's housing 52 by the securing members 54. FIG. 6 also shows looped rope member 58 passing through center protruding member's 51 center hole, the internal rope member channel 53.

FIG. 7 is a cross-sectional view of securing device 50 as shown in FIG. 5. In this embodiment, the internal rope member channel 53 (which is the only internal channel in this exemplary embodiment), passing through center protruding member 51, may have a diameter that is at least twice the diameter of rope member 58 so as to be able to fit rope member 58 when rope member 58 is looped and ran through the internal rope member channel 53. Thus, internal rope member channel 53 is sized to allow for rope member to be looped and pass through securing device 50 twice. Alternatively, two separate rope members may be able to pass through securing device 50. The diameter of internal rope member channel 53 is sized to complement the size and diameter of rope member 58, but is also not too large so that rope member 58 cannot move freely and come loose after being inserted through the bore of internal rope member channel 53. In other words, the inner surfaces of interior rope member channel 53 press against the sides of rope member 58 when inserted therein and restrict movement either upwards or downwards by the rope member. Additionally, as shown in FIG. 7, the securing device 50 may include barbs, such as barbs 62, that function in a similar fashion as barbs the barbs 36 and 38 shown in FIG. 3 and described above. Alternatively, securing device 50 does not have any barbs and is still able to restrict movement of rope member 58 based on the functional components and design of securing device 50 as described above.

Figure 8:
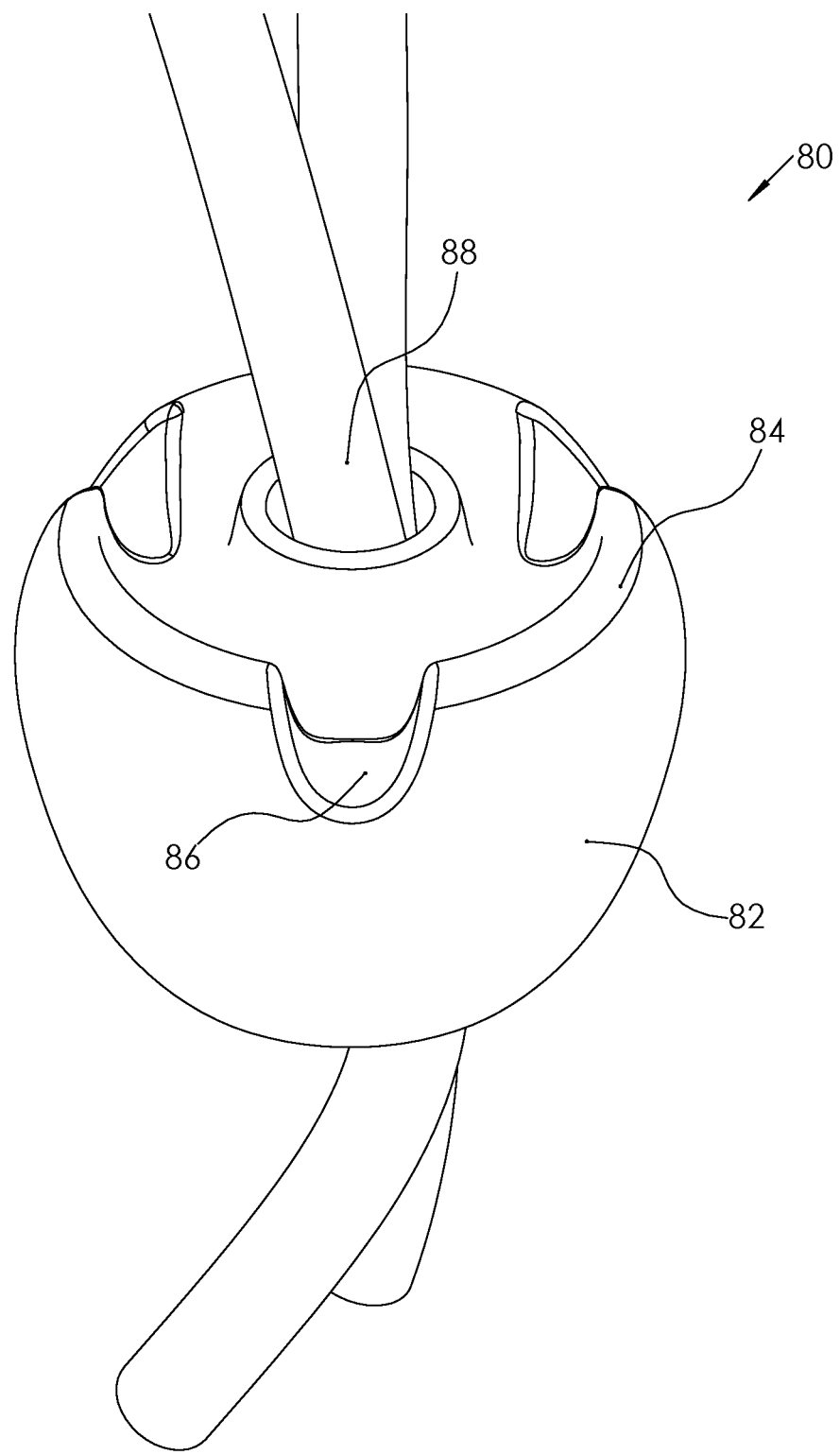
FIG. 8 is a view of one embodiment of an exemplary securing device.

Turning to FIG. 8, FIG. 8 is a view of an alternative embodiment for a securing device. The exemplary securing device 80, shown in FIG. 8, has three securing members, such as securing members 84. The securing members 84 in this embodiment have a longer length in terms of the distance that the securing member 84 protrudes from the top of the housing for securing device 80. It may be useful to have such an embodiment in that it may be able to hold a rope member more securely, but it is noted that in addition there may be fewer valleys, such as valleys 86, from which the rope member can enter and exit. In another embodiment (not shown), securing device 80 can have a second internal rope member channel.

Figure 9:
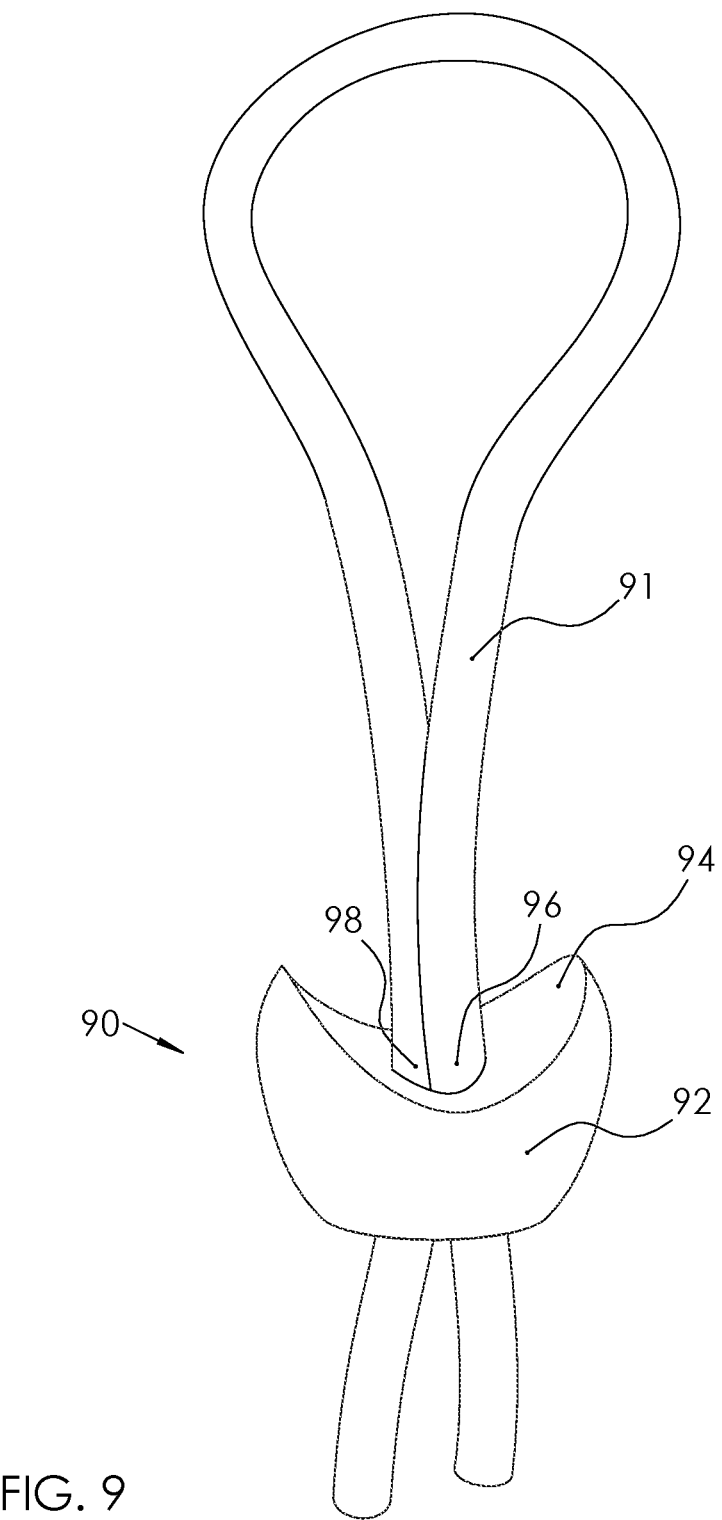
FIG. 9 is side view of one embodiment of a securing device.

FIG. 9 shows a side view another alternative embodiment of a useful securing device. The securing device 90, shown in FIG. 90, has a housing 92, and two securing members 94. In FIG. 9, the securing device 90 is shown with rope member 91, with upper portions 98 and 96 of the rope member 91 both passing through the internal rope member channel. In this alternative embodiment, the upper surface of securing device 90 includes two larger valleys as opposed to the multiple smaller valleys shown in FIGS. 1-8 and described above. This embodiment is helpful, for example, when the user desires a larger diameter rope, and the user wants to maintain a smaller housing, such as the housing 92. One of ordinary skill may view other applications that may be useful also and within the scope of the present description.

Figure 10:
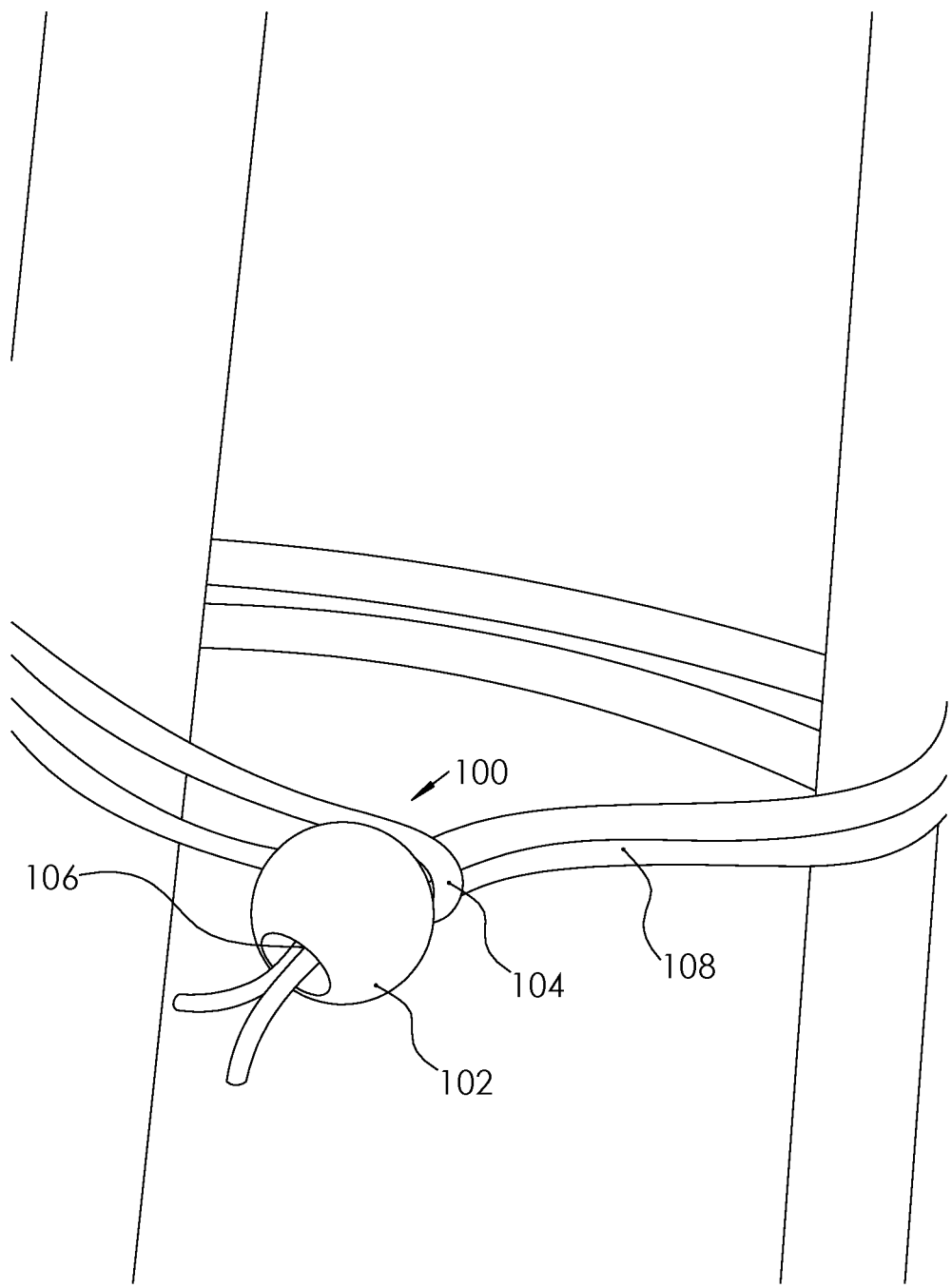
FIG. 10 is a side view of a ball bungee device in accordance with an illustrative embodiment.

FIG. 10 is a side view of ball bungee 100, and shows how ball bungee 100 may be used in operation. As shown in FIG. 10, a singular rope member 108 is looped and passed through the internal rope member channel of ball bungee 100 at least two times. As shown in this exemplary embodiment, ball bungee 100 has one interior hole, and the rope member may then be tied in a knot that stays within the interior channel 106. This knot should preferably be larger than the internal channel of ball bungee 100 to prevent the ball bungee from coming off of the rope member. Additionally, as shown in FIG. 10, in one or more embodiments, ball bungee 100 does not include any securing members, so it is important to ensure that rope member is fastened tightly and movement thereof is restricted to prevent rope member from coming undone.

Figure 11:
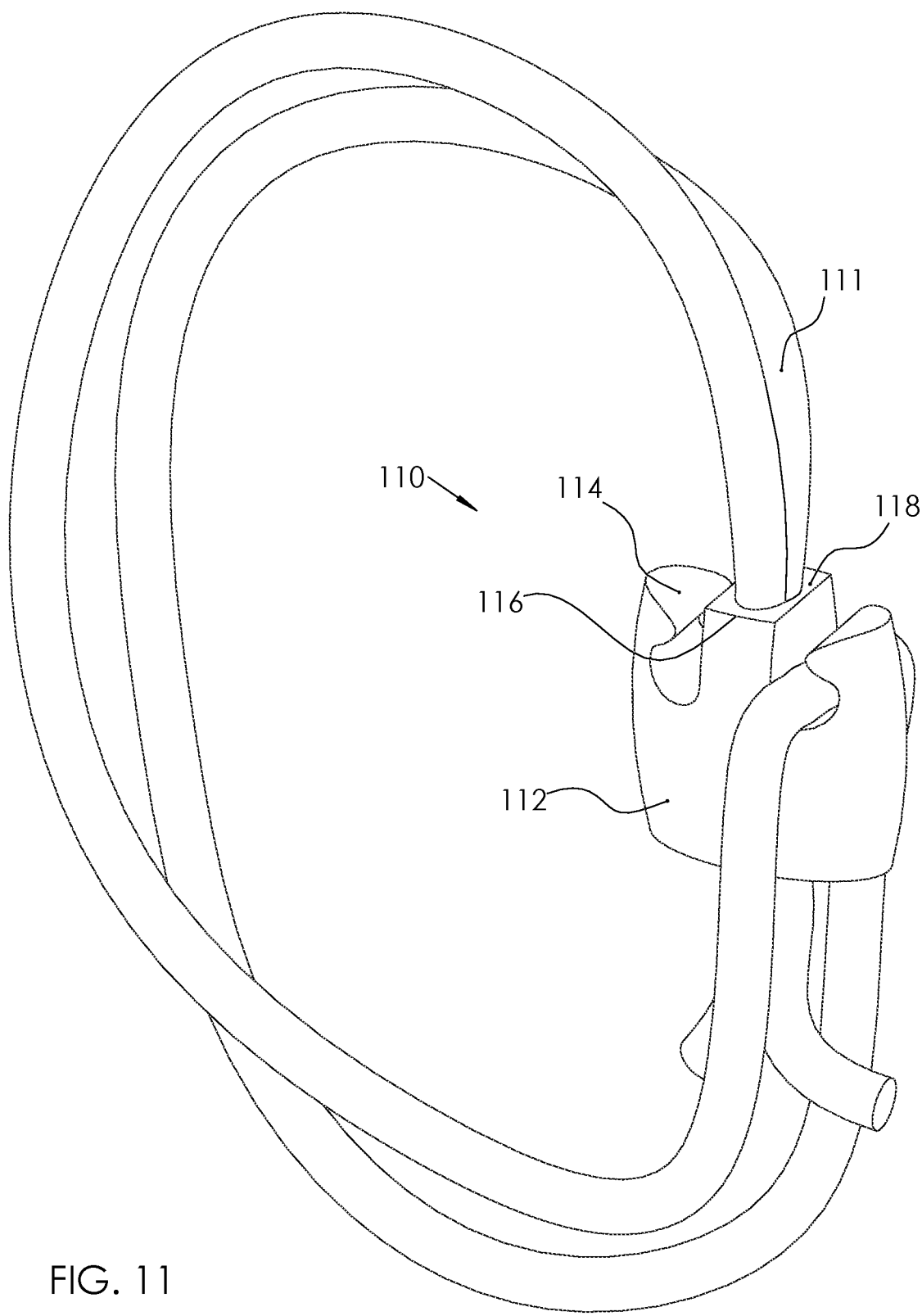
FIG. 11 is a side view of one embodiment of a securing device.

FIG. 11 is a side view of an alternative embodiment. As shown in FIG. 11, the securing device 110 has a different appearance than some of the other securing devices described above and shown in FIGS. 1-10. This embodiment of a securing device 110 may have a more rectangular like shape (although any other suitable shape may also be used). Additionally, this embodiment shows that the securing members 114 can shaped similar to that of a clip and includes a recessed channel on either side of center protruding member 118 for a rope member to pass through. The securing members 114 can also be manufactured in a way that the surfaces of the housing 112 of the securing device 110 where the rope member 111 is located has a diameter smaller than the diameter of the rope member, thus holding the rope member 111 in place by pinching or restricting the rope member to these surfaces of the housing 112. In one embodiment, in order for the user to remove the rope member from the securing device 114, the user may pull back the securing members 114 from the top in a direction away from the housing 112, which allows for the hold or grip of securing members 114 to be loosened with respect to the rope member, and thus allowing for the user to remove the rope member 111. It is noted that in one embodiment, the front surface of the housing 112 can be made to be any color, and is of a material that logo or other information can be formed as part of the housing 112 during manufacturing, or applied separately with a label.

Figure 12:
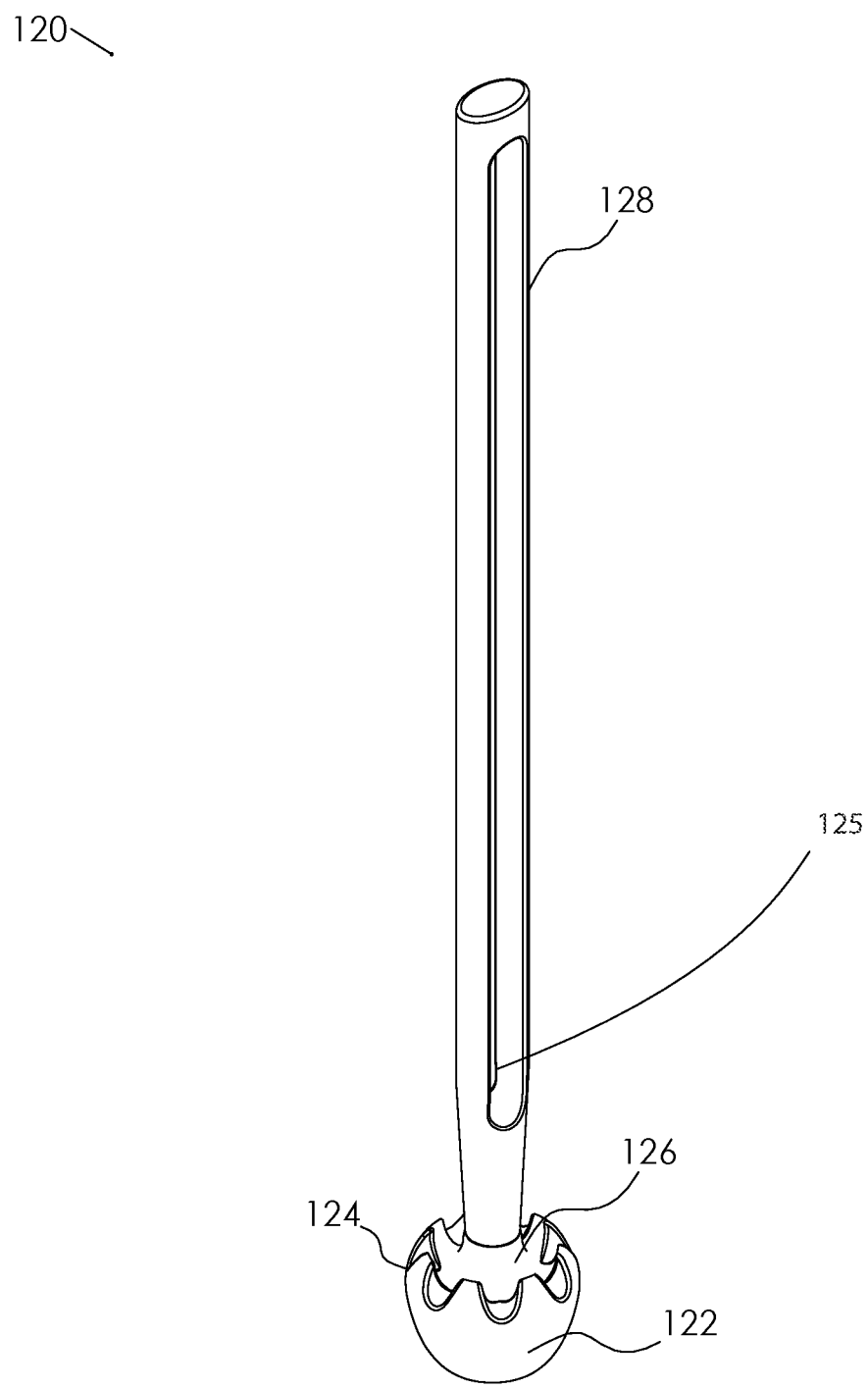
FIG. 12 is a side view of one embodiment of a securing device having an attached connection member having an opening included within the body of the attached connection member.

FIG. 12 is a side view of another exemplary securing device 120. This embodiment of a securing device 120, shown in FIG. 12, includes a connecting member, such as the connecting member 128, which extends upwardly from above and attached to the housing 122. Connecting member 128, in one or more embodiments, may replace a rope member and the act of looping the rope member through one or more interior channels of a housing of a securing device (such as the looping shown in FIG. 1, FIG. 4, FIG. 5, FIG. 7 and elsewhere throughout the present description).

Connecting member 128 may be made of any suitable material known in the art including, but not limited to, rubber, plastic, nylon, or any other suitable material. Connecting member 128 includes an aperture 125 defined by the body of the connecting member 128. As shown in FIG. 12, the connecting member 128 has a somewhat rectangular shape but any other shape may alternatively be used. In some embodiments, a top surface of the connecting member 128 may be curved. In one or more embodiments, the securing device 120 may be bendable, and is thus formed of a flexible material.

Figure 13:
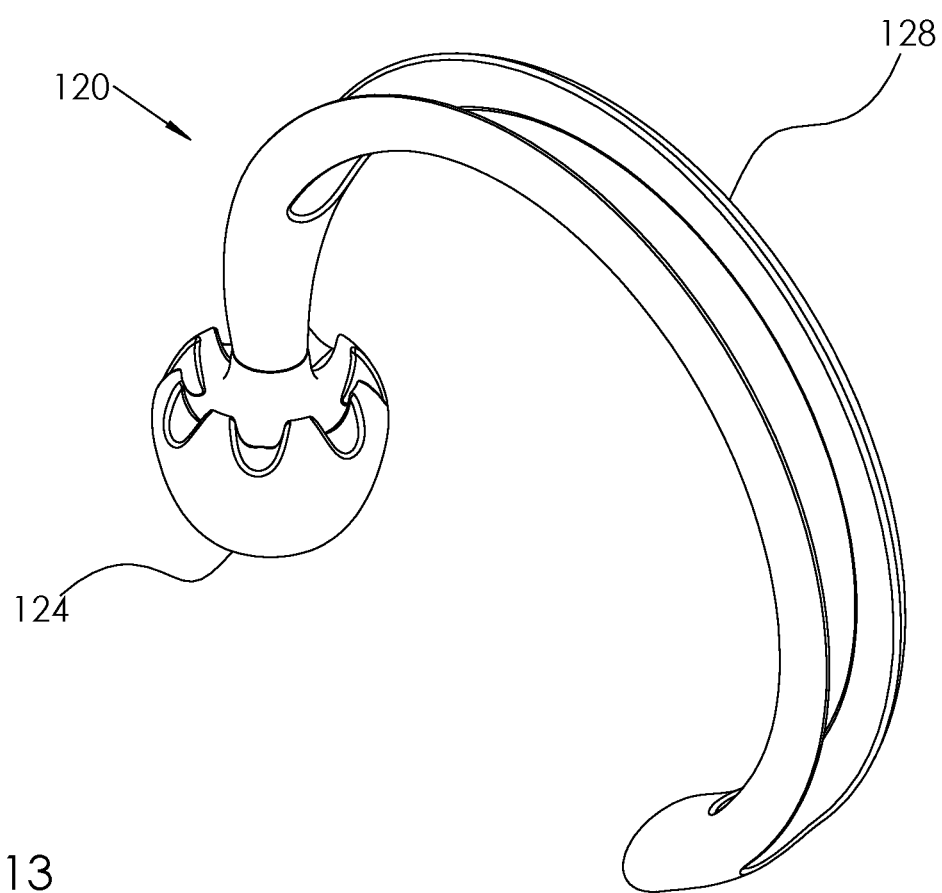
FIG. 13 is a view of the securing device shown in FIG. 12 with an exemplary bendable, flexible connection member according to an illustrative embodiment.

Turning to FIG. 13, FIG. 13 shows the securing device 120 in a bent position and illustrates how securing device 120 may appear when used in operation. Instead of using a separate rope member (e.g. rope member 8) to pass through the housing 122 of the securing device 120, the attached connecting member 128 is adapted to be bent and, wrapped around the objects the user desires to be secured together. The connecting member 128 can wrap around the housing 122 through the aperture included in the body of the connecting member 128, and then the housing 122 can be inserted through the top opening of the connecting member 128, and secured to said housing 122 by the securing members 124. The trough 126 shows where the top opening of the connecting member 128 would rest on the housing 122 when the securing device 120 is in use, and the housing 122 had been inserted through the top opening of the connecting member 128, to tie down a cover member or other object.

In an alternative embodiment to that shown in FIGS. 12-13, the connecting member 128 is not attached to the housing 122, but rather may be a separate accessory or entity that is attachable to the above-mentioned embodiments through their internal rope member channels (e.g. the respective internal rope member channels for securing device 10, securing device 20, securing device 40, securing device 50, securing device 80, and securing device 110 as shown in their corresponding Figures).

It is noted that any of the securing devices shown in FIGS. 1-13 may be formed from any suitable material, even if the cross-hatching used in any of these Figures may be illustrative of a material.

Advantageously, the present description provides one or more embodiments of various types of securing devices. Each securing device depicted herein provides advantages that overcome shortcomings of other types of securing devices (ex. ball bungees, zip ties, ropes) that are used conventionally. Further, the various embodiments shown in the Figures and described herein accommodate different sized ropes (or other types of known objects used to tie or hold items together) and may be used in various applications, including, but not limited, to holding down a tarp or other cover member. It is noted that the various embodiments of securing devices presented herein may be used in many other ways other than to hold a tarp or other cover member in place. For example, the various securing devices may generally be used to attach two or more objects together in a secure fashion regardless of what type of objects are involved. Thus, the various embodiments described in the present description include a number of novel and helpful components that provide enhanced securing devices to benefit a user.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A securing device comprising:
   a housing;
   one or more securing members that protrude upwardly from a top surface of the housing;
   a trough, wherein the trough is a recessed portion that runs along the top surface of the housing and located just beneath the one or more securing members;
   at least one internal channel configured to receive a portion of a rope member, wherein the at least one channel is generally centrally located through the top surface of the housing; and
   a reservoir located the at least one internal channel and within an interior part of the housing.

2. The securing device of claim 1, wherein the at least one internal channel is extended downwardly through a body of the securing device.

3. The securing device of claim 2, wherein the at least one internal channel includes at least one pointed barb near an end portion of the at least one internal channel, wherein the at least one pointed barb is configured to prevent upward movement of the rope member.

4. The securing device of claim 1, further comprising a central protruding member that protrudes from the top surface of the housing.

5. The securing device of claim 4, wherein the securing device includes two internal channels, and the central protruding member is between the two internal channels, the central protruding member vertically extending beyond the remainder of securing device.

6. The securing device of claim 5, wherein the reservoir is located beneath a bottom portion of the internal channels.

7. The securing device of claim 4, wherein one or more barbs configured to point downward is located at an end of each side of the center protruding member.

8. The securing device of claim 4, further comprising, one or more valleys located between each of the one or more securing members, wherein a portion of the rope member is configured to be inserted through one of the one or more valleys wherein a portion of the rope member is then wrapped around the center protruding member permitting the rope member to rest along the trough and exit through a second valley of the one or more valleys, securing the rope member to the securing device.

9. The securing device of claim 1, wherein said reservoir is located at a bottom end of said securing device and is connected to said at least one internal rope member channels.

10. The securing device of claim 4, further comprising, a divider.

11. The securing device of claim 10, wherein said divider is located below the center protruding member and the diameter between said divider and a surface of said at least one internal channel is capable of securing the said securing device to a rope member through friction.

12. A securing device, the securing device comprising:
a spherical shaped housing having a first end and a second end, wherein said first end comprises at least one securing member, at least one center protruding member, at least one internal channel capable of securing to a rope member, and said second end of said securing device is comprised of a reservoir, and a looped rope member having a plug, wherein said at least one internal channel run through the securing device laterally from said first end to said second end.

13. The securing device of claim 12, wherein said plug is configured to connect to said internal channel of said securing device.

14. The securing device of claim 12, wherein said at least one securing member is tooth shaped.

15. The securing device of claim 12, wherein said at least one securing member is hooked shaped.

16. A method of securing a securing device to a rope member, comprising:
pushing a first end of a rope member through a first internal channel located on a top end of securing device;
pushing a second end of said rope member through said first internal channel of a securing device or a second internal channel located on a top end on said securing device, wherein said rope member forms a loop directed away from said first and second rope member ends secured to said securing device; and
tying said first end and said second end of said rope member into a knot and securing said knot into a reservoir located on a bottom end of said securing device,
wherein when said loop is capable of being wrapped around an object, and said loop can be secured to said securing device with securing members located on said object.

17. The method of claim 16, wherein one or more securing members located on said securing device hold said rope member to the securing device when said rope member is under tension because the securing members are tooth shaped.

* * * * *